(12) United States Patent
Kerselaers

(10) Patent No.: US 10,917,138 B2
(45) Date of Patent: Feb. 9, 2021

(54) NEAR-FIELD COMMUNICATIONS DEVICE

(71) Applicant: NXP B.V., Eindhoven (NL)

(72) Inventor: Anthony Kerselaers, Herselt (BE)

(73) Assignee: NXP B.V., Eindhoven (NL)

( * ) Notice: Subject to any disclaimer, the term of this patent is extended or adjusted under 35 U.S.C. 154(b) by 141 days.

(21) Appl. No.: 16/260,322

(22) Filed: Jan. 29, 2019

(65) Prior Publication Data

US 2020/0244315 A1    Jul. 30, 2020

(51) Int. Cl.
*H04B 5/00* (2006.01)
*H02J 50/40* (2016.01)
*H02J 50/50* (2016.01)

(52) U.S. Cl.
CPC ............ *H04B 5/0037* (2013.01); *H02J 50/40* (2016.02); *H02J 50/50* (2016.02); *H04B 5/005* (2013.01)

(58) Field of Classification Search
CPC .............................. H04B 5/0037; H04B 5/005
See application file for complete search history.

(56) References Cited

U.S. PATENT DOCUMENTS

| | | | |
|---|---|---|---|
| 8,643,538 B2 * | 2/2014 | Schantz | G01S 5/14 342/125 |
| 9,484,522 B2 | 11/2016 | Andosca et al. | |
| 2008/0054638 A1 * | 3/2008 | Greene | H02J 50/40 290/1 R |
| 2010/0119242 A1 * | 5/2010 | Hayashi | H04B 17/309 398/210 |
| 2011/0148714 A1 * | 6/2011 | Schantz | G01S 5/14 342/458 |
| 2012/0086285 A1 * | 4/2012 | Hyoung | H02J 50/00 307/104 |
| 2013/0207603 A1 * | 8/2013 | Kappeler | H01P 7/00 320/108 |
| 2014/0210276 A1 | 7/2014 | Shinoda et al. | |
| 2017/0104372 A1 | 4/2017 | Kadoyama | |
| 2017/0324170 A1 | 11/2017 | Kerselaers et al. | |
| 2018/0351389 A1 * | 12/2018 | Morier | G06F 3/038 |
| 2020/0220576 A1 * | 7/2020 | Richter | H04B 5/0043 |

FOREIGN PATENT DOCUMENTS

GB    2531855 A    5/2016

* cited by examiner

*Primary Examiner* — Jared Fureman
*Assistant Examiner* — Emmanuel Dominique

(57) ABSTRACT

One example discloses a near-field communications device, including: an energy harvesting circuit configured to be coupled to a near-field antenna that is responsive to non-propagating quasi-static near-field energy; wherein the harvesting circuit is configured to harvest energy from the non-propagating quasi-static near-field energy; and wherein the harvesting circuit includes a harvesting filter configured to input a first set of near-field energy and output a second set of near-field energy; and wherein the second set of near-field energy is a sub-set of the first set of near-field energy.

19 Claims, 8 Drawing Sheets

NEAR-FIELD COMMUNICATIONS DEVICE

The present specification relates to systems, methods, apparatuses, devices, articles of manufacture and instructions for near-field communications.

SUMMARY

According to an example embodiment, a near-field communications device, comprising: an energy harvesting circuit configured to be coupled to a near-field antenna that is responsive to non-propagating quasi-static near-field energy; wherein the harvesting circuit is configured to harvest energy from the non-propagating quasi-static near-field energy; and wherein the harvesting circuit includes a harvesting filter configured to input a first set of near-field energy and output a second set of near-field energy; and wherein the second set of near-field energy is a sub-set of the first set of near-field energy.

In another example embodiment, the near-field communications device is configured to receive a desired near-field communications signal from the first set of near-field energy; and the desired near-field communications signal is substantially blocked by the harvesting filter.

In another example embodiment, the near-field communications device is configured to receive near-field energy from the first set of near-field energy that does not include a desired near-field communications signal; and the near-field energy that does not include the desired near-field communications signal is substantially passed by the harvesting filter.

In another example embodiment, the harvesting filter includes a minima gain at a blocking frequency.

In another example embodiment, the blocking frequency is substantially aligned with a center frequency of the desired near-field communications signal.

In another example embodiment, the center frequency of approximately 10.6 MHz.

In another example embodiment, the harvesting filter has minima gains at multiple blocking frequencies; and each minima is substantially aligned with center frequencies of multiple desired near-field communications signals.

In another example embodiment, the harvesting filter is a band-pass filter having a set of passed frequencies; and the second set of near-field energy is only within the set of passed frequencies.

In another example embodiment, the harvesting filter is wither a high-pass filter or a low-pass filter having a respective set of either high-passed frequencies or low-passed frequencies; and the second set of near-field energy is only within the set of passed frequencies.

In another example embodiment, the harvesting circuit further includes a bypass switch; the harvesting circuit is configured to harvest energy from the first set of near-field energy if the bypass switch control signal is present; and the harvesting circuit is configured to harvest energy from the second set of near-field energy if the bypass switch control signal is absent.

In another example embodiment, further comprising a communications circuit; wherein the communications circuit is configured to generate the bypass switch control signal when the communications circuit is either in a standby state, disabled state, or turned off state.

In another example embodiment, the communications circuit is configured to periodically, aperiodically, or randomly switch from either the standby state, disabled state, or turned off state to another state that permits the communications circuit to search or receive the desired near field communication signal.

In another example embodiment, the harvesting circuit is configured to harvest and store the near-field energy in an energy storage device; and the communications circuit is configured to drain power from the energy storage device only in either the standby state, disabled state, or turned off state.

In another example embodiment, further comprising a communications circuit; wherein the communications circuit includes a communications filter; wherein the communications filter includes a maxima gain at a pass frequency; and wherein the pass frequency is substantially aligned with a center frequency of the desired near-field communications signal.

In another example embodiment, the near-field antenna is responsive to non-propagating quasi-static near-field electric (E-field) energy; and the harvesting circuit is configured to harvest energy from the E-field energy.

In another example embodiment, the near-field antenna includes a set of conductive plates responsive to the E-field energy; the conductive plates are connectable to the harvesting filter; and the harvesting circuit is configured to harvest and store the E-field energy in an energy storage device.

In another example embodiment, the harvesting circuit includes a rectifier and a power regulator; and the rectifier and power regulator are configured to harvest and store the second set of near-field energy in an energy storage device.

In another example embodiment, the near-field communications device is configured to be located proximate to a conductive structure; and the near-field antenna receives the non-propagating quasi-static near-field energy from the conductive structure.

In another example embodiment, the conductive structure is at least one of: a human body, a vehicle, or a door security device.

In another example embodiment, the near-field communications device is embedded in at least one of: a wearable device, an earbud, a medical monitoring device, a smartwatch or an implant.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings.

Figure 1:
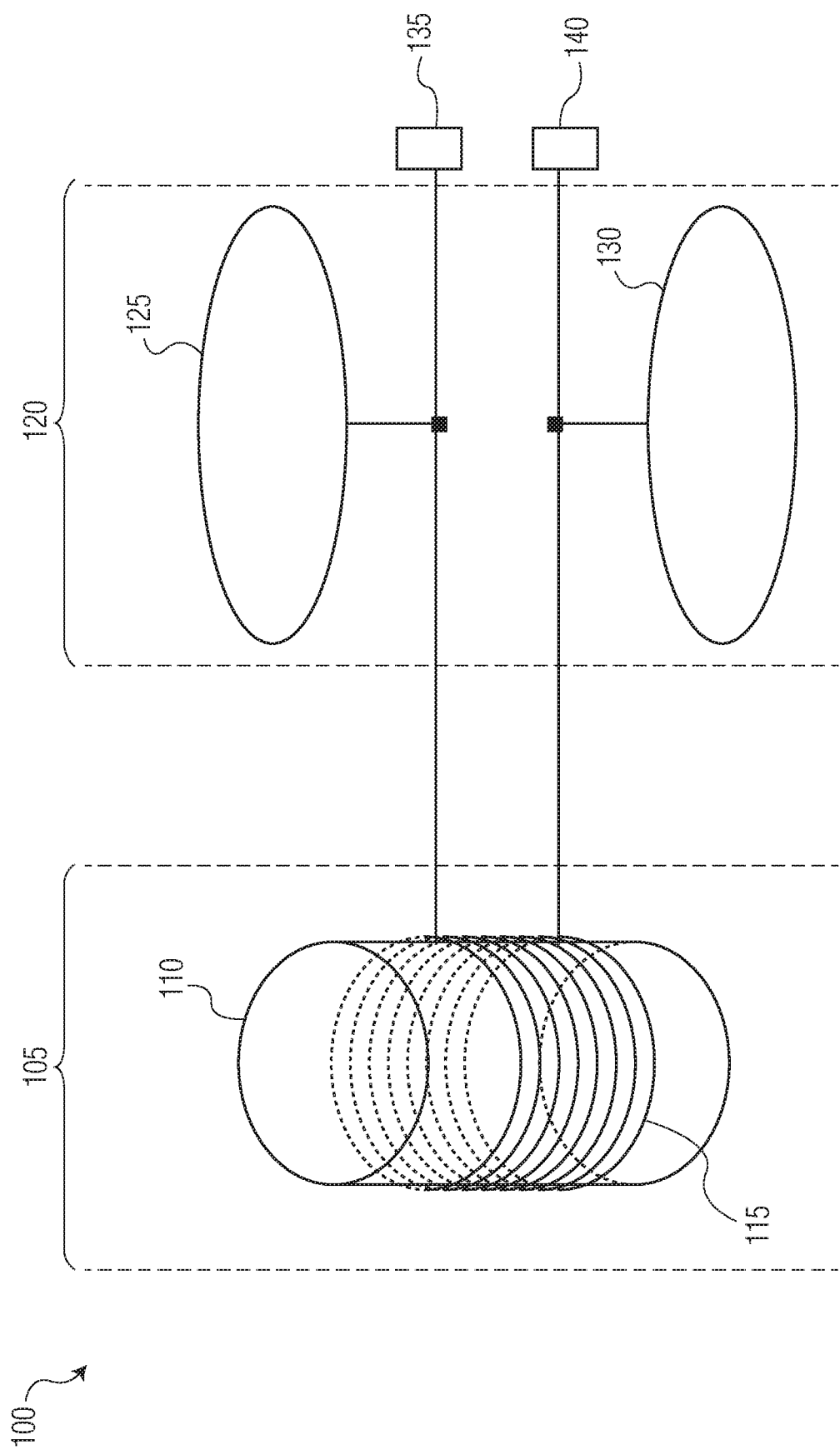
FIG. 1 is an example idealized near-field electromagnetic induction (NFEMI) antenna.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Herein discussed are on body communication and communications with other wireless networked devices (e.g. Internet of Things (IoT) devices) based on near-field electromagnetic induction (NFEMI), where the transmitter and receiver are coupled by both magnetic (H) and electric (E) fields. While RF wireless communication is accomplished by propagating an RF plane wave through free space, NFEMI communication utilizes non-propagating quasi-static H and E fields.

An H-field antenna (i.e. magnetic antenna) is primarily sensitive to magnetic fields and/or primarily initiates magnetic fields when driven by a current. Any E-field component from an H-field antenna is strongly reduced (e.g. −20 to −60 dB reduction, a factor of 0.1 to 0.0008 (10% to 0.08%) depending on the antenna design).

A small loop antenna is an example H-field antenna and includes a loop antenna with dimensions much smaller than the wavelength of its use. The small loop antenna does not resonate at the NFEMI carrier frequency but is instead tuned to resonance by an external reactance. In some example embodiments the current in the small loop antenna has in every position of the loop the same value.

An E-field antenna (i.e. electric antenna) is primarily sensitive to electric fields and/or primarily initiates electric fields when driven by a voltage. Any H-field component from an E-field antenna is strongly reduced (e.g. −20 to −60 dB reduction, a factor of 0.1 to 0.0008 (10% to 0.08%) depending on the antenna design).

A short loaded dipole antenna is an example E-field antenna and includes a short dipole with dimensions much smaller than the NFEMI carrier frequency and in some example embodiments has extra capacitance structures at both ends.

The quasi-static characteristic of these fields is a result of the NFEMI antenna dimensions in combination with their carrier frequencies. Most of the near-field energy is stored in the form of magnetic and electric fields, while a small amount of RF energy inevitably propagates in free space. Small antenna geometries minimize radiating waves in free space.

Some wearables, such as hearing aids and wireless earbuds, employ Near-Field Magnetic Induction (NFMI) as a wireless communication method. In NFMI wireless communication, two loosely coupled coils realize signal transfer. No radiation of radio waves takes place. A current flowing in the transmission coil generates a H-field which in turn induces a current in the receiving coil. In this way, wireless communication is accomplished. Unfortunately, H-field based NFMI systems with small antenna coils have a limited range that may be much smaller than an entire wearable user's body. Such H-field communications are sensitive to coil orientation. In the case of a hearing aid form factor, a H-field induction based system cannot cover an entire human body. However, since in hearing aids both coils are always aligned with each other, they are not influenced by the movement of the human body.

Other wearables employ Near-field Electric Induction (NFEI)) as a wireless communication method. NFEI allows electronic devices on and near a conductive structure (e.g. a human body) to exchange information through E-field coupling (e.g. at 21 MHz). NFEI is also sometimes called Body Coupled Communication (BCC). While E-field based NFEI signals can have a greater range than H-field based NFMI signals, the E-field signal strength can vary with regard to body posture and is sensitive to body movements. The body can even partially block a capacitive return path, thereby increasing E-field channel loss and reliable and robust wireless communication is not possible.

FIG. 1 is an example idealized near-field electromagnetic induction (NFEMI) antenna 100. In some example embodiments, the antenna 100 includes a coil (H-field) antenna 105 for magnetic fields, in conjunction with a short loaded dipole (E-field) antenna 120 for electric fields. The H-field antenna 105 includes a ferrite core 110 wound with wire 115. The E-field antenna 120 includes two conductive loading structures 125 and 130. Antenna 100 feed points 135, 140 are coupled to various transceiver circuitry, such as downstream radio transmitter and receiver integrated circuit (RF-IC), (not shown here).

When the NFEMI antenna 100 is proximate to a structure (e.g. a conductive structure, a body, a person, an object, etc.) the magnetic and electric fields will be substantially confined to the structure and not significantly radiate in free-space. This enhances security and privacy of such body networked communications.

In various example embodiments, the antenna 100 operates at or below 50 MHz (e.g. for example at 30 MHz) to ensure that the fields are following the structure's contours and to ensure that far field radiation is strongly reduced.

Figure 2:
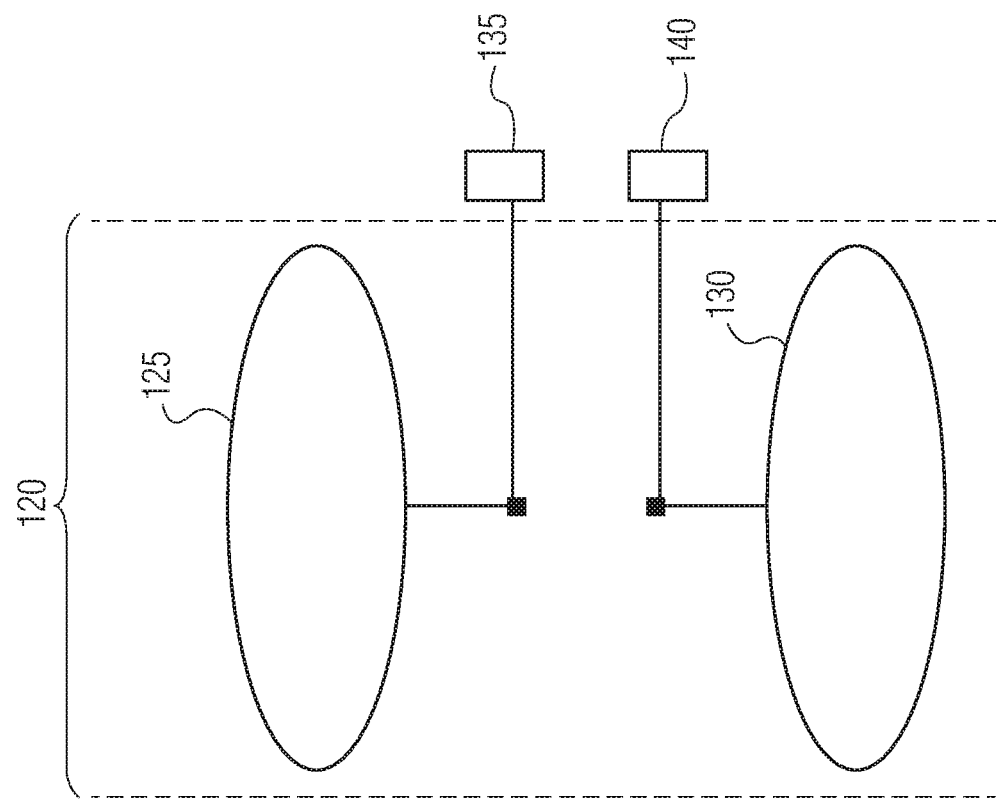
FIG. 2 is an example idealized near-field electro induction (NFEI) antenna.

FIG. 2 is an example idealized near-field electro induction (NFEI) antenna 200. In some example embodiments, the antenna 200 includes a short loaded dipole (E-field) antenna 120 for electric fields. The E-field antenna 120 includes two conductive loading structures 125 and 130. Antenna 200 feed points 135, 140 are coupled to various transceiver circuitry, such as downstream radio transmitter and receiver integrated circuit (RF-IC), (not shown here). In some example embodiments the transmit frequency is below 50 MHz to ensure that the near-fields are following the body contours and far field radiation is strongly reduced.

On-body NFEI communication, however, can be prone to electro-magnetic (EM) interference that occurs when unwanted radio frequency signals disrupt the near-field communications. Interference may prevent reception altogether, may cause only a temporary loss of a signal, or may affect the quality of the reception of the sound or data. The interference can come from a variety of sources, including nearby electric and electronic systems (e.g. light source regulation, household appliances, refrigerators, coffee machines, etc.).

For example, a human body acts as an antenna for some of these electro-magnetic interference signals because tissues composing the human body have a high dielectric constant under 80 MHz. Electromagnetic waves between 30 and 80 MHz have wavelengths comparable to a length of an entire human body all the way to various body parts, such as arms and legs.

Figure 3:
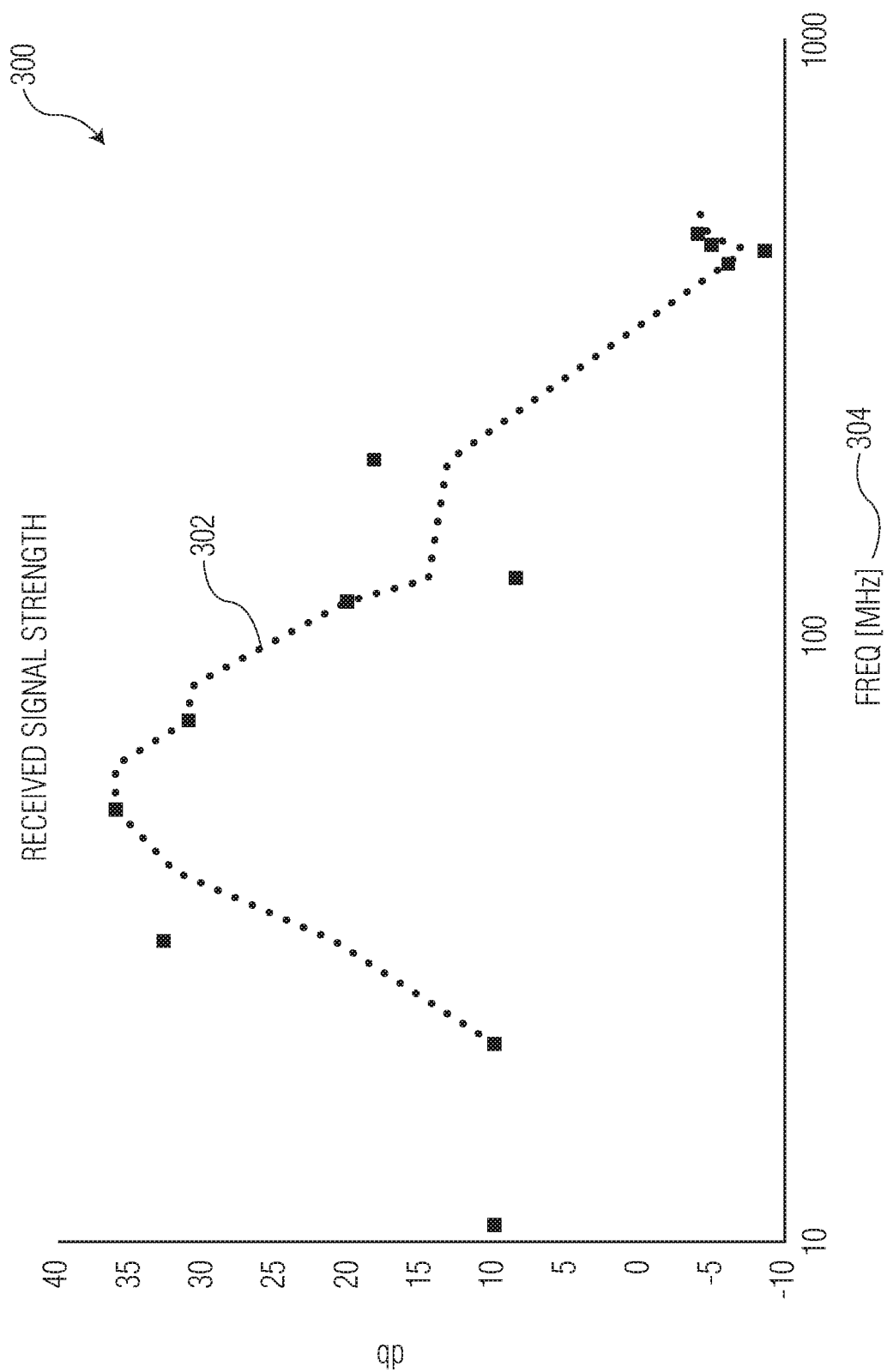
FIG. 3 is an example graph of received signal strength verses communication frequency for a body-worn (e.g. wearable) NFEI antenna.

FIG. 3 is an example graph 300 of received signal strength 302 by a conductive structure (e.g. a human body) verses communication frequency 304 (i.e. log 10 scale) for a body-worn (e.g. wearable) NFEI antenna (e.g. short dipole antenna). The received signal strength 302 relative amplitude (dB) shows a susceptibility of a human body to received electromagnetic fields.

Conductive structures such as a human body acts as an antenna because a body's conductive tissues have a high dielectric constant at 80 MHz. Measurements and simulations show that a human body resonates at between 30-70 MHz, depending on the posture of the body, height, gender, isolation between feet and ground and type of ground.

Electromagnetic wave frequencies below about 80 MHz induce currents into a human body, resulting in an electric field (E-field) vector perpendicular to surfaces of the body. As indicated by the graph 300, induced currents are relatively low at 10 MHz and is at a maximum at about 60 MHz. However, depending on the environment, strong E-field interference can also be found below 1 MHz, especially around 100 KHz (not shown here). These measurements show that relative signal strengths of received electromagnetic fields are also at a maximum at the resonance frequency of the human body.

While this E-field (and H-field) energy received from electric devices such as smart phones, Wi-Fi devices, Bluetooth devices, electric home devices, mains power from wall-outlets, and environmental devices can be seen as interference, now presented are circuits, devices, apparatus and methods for harvesting energy from such non-communications E-fields (and H-fields) using a modified near-field communications device. The discussion below includes how a short loaded dipole (E-field) antenna 120 can not only serve as an E-field antenna for near field communication, but also as an energy harvesting source.

Figure 4:
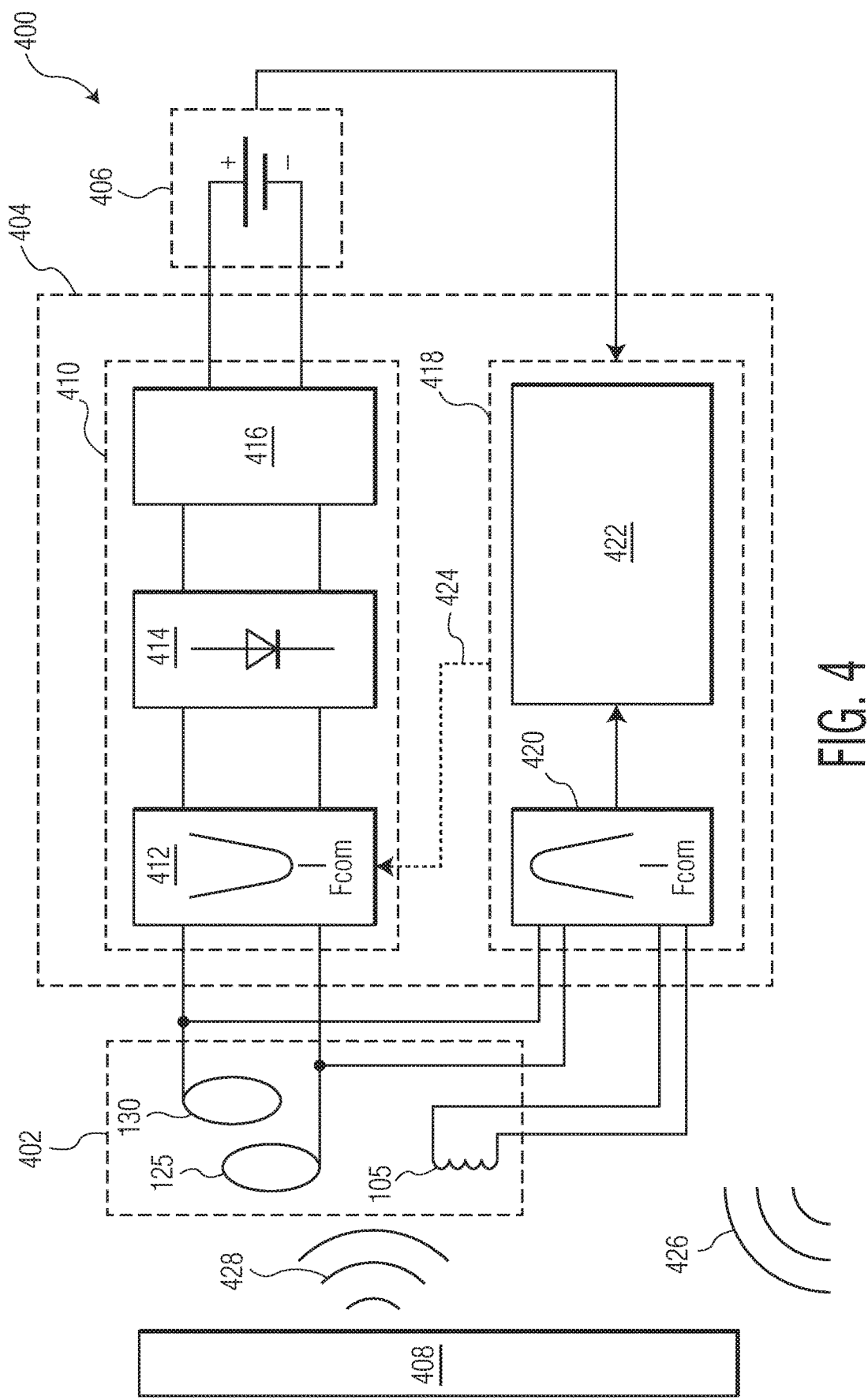
FIG. 4 is an example first near-field communications device.

FIG. 4 is an example 400 first near-field communications device 404. The example 400 shows a near-field antenna 402, a first near-field communications device 404, an energy storage device 406 (e.g. battery, capacitor, etc.), a conductive structure 408, an ambient near-field energy 426, and closely coupled near-field energy 428 received from the conductive structure 408.

The near-field antenna 402 includes conductive plates 125, 130 (responsive to E-field energy) and coil 105 (responsive to H-field energy). The near-field antenna 402 is either an NFEI (near-field electro-induction) antenna, or an NFEMI (near-field electromagnetic induction) antenna.

In some example embodiments the near-field antenna 402 is responsive primarily or only to non-propagating quasi-static near-field electric (E-field) energy, and the harvesting circuit 410 is configured to harvest energy from primarily or only the E-field energy. The set of conductive plates 125, 130 are responsive to the E-field energy.

In some example embodiments the near-field antenna 402 is configured to be located proximate to (e.g. near) the conductive structure 408, such that the near-field antenna 402 receives the ambient near-field energy 426 primarily from the closely coupled near-field energy 428 radiated by the conductive structure 408. The conductive structure 408 can be: a human body, a vehicle, or a door security device.

The first near-field communications device 404 includes an energy harvesting circuit 410 and a communications circuit 418. The energy harvesting circuit 410 includes a harvesting filter 412 (e.g. notch filter, high-pass, low-pass, or band-pass filter configured to block a set of desired near-field communications frequencies), a rectifier 414, and a power regulator 416 (e.g. voltage or current regulator). The communications circuit 418 includes a communications filter 420 (e.g. notch filter, high-pass, low-pass, or band-pass filter configured to pass the set of desired near-field communications frequencies), a signal processing circuit 422, and a bypass switch control 424.

A desired near-field communications signal is herein defined to include near-field communications signals that are intended for, directed specifically to, or includes data to be further processed by the near-field communications device 404. For example, the desired signal can include a message, a control signal, or the like that either is output from the near-field communications device 404 on a display, relayed to another communications device of some sort, used to control the near-field communications device 404, and the like.

The desired near-field communications signal does not include other near-field communications signal not intended for, not directed specifically to, or that do not include data to be further processed by the near-field communications device 404. The desired near-field communications signal also does not include other signals such as: ambient noise, interference signals, spurious signals, etc.

The energy harvesting circuit 410 configured to be coupled to the near-field antenna 402 which is responsive to non-propagating quasi-static near-field energy (i.e. either the ambient near-field energy 426 and/or the closely coupled near-field energy 428). The harvesting circuit 410 harvests energy from the non-propagating quasi-static near-field energy. The harvesting filter 412 is configured to receive a first set of near-field energy and output a second set of near-field energy. The second set of near-field energy is a sub-set of the first set of near-field energy.

While the desired near-field communications signal is included in the first set of near-field energy, the desired near-field communications signal is substantially blocked by the harvesting filter 412. The harvesting filter 412 (e.g. wideband) blocks the desired communication frequencies so as not to load (i.e. damp) when the communications circuit 418 processes the desired near field communication signal frequencies.

In some example embodiments, the harvesting filter 412 has multiple blocking frequencies so as to allow multiple desired near field communication signal frequencies to pass to the communications circuit 418.

In some example embodiments, when the communications circuit 418 is in a standby state, disabled state, or turned off state, the communications circuit 418 sends a bypass switch control 424 to the harvesting circuit 410 so that the harvesting filter 412 is bypassed (i.e. using a bypass switch 502, see FIG. 5A) and all near-field frequencies are permitted to pass through to the rectifier 414, including the desired near field communication signal frequencies, thereby increasing a total harvested energy.

The harvesting filter 412 block in FIG. 4 shows an example graphic of the harvesting filter's 412 frequency response (i.e. gain as a function of frequency) with only one minima gain that appear to also be a minimum gain, in other example embodiments the harvesting filter 412 has minima gains at multiple blocking frequencies, and each minima is substantially aligned with center frequencies of multiple desired near-field communications signals. An example center frequency for on-body near-field communications is approximately 10.6 MHz.

The harvesting filter 412 can be configured as a band-pass filter, a high-pass filter or a low-pass filter having a set of passed frequencies, whereby the second set of near-field energy is only within the set of passed frequencies.

The harvesting circuit 410 is configured to harvest and store the near-field energy in the energy storage device 406 using the rectifier 414 and the power regulator 416.

The communications circuit's 418 communications filter 420 includes a maxima gain at a pass frequency substantially aligned with a center frequency of the desired near-field communications signal.

The communications filter 420 block in FIG. 4 shows an example graphic of the communications filter's 420 frequency response (i.e. gain as a function of frequency). In some examples, as mentioned earlier, the desired near field communication signal (e.g. to be received and processed by the communications circuit 418) has a center frequency (Fcom) of 10.6 MHz.

In some example embodiments, the communications filter 420 is optional, however in such embodiments the signal processing circuit 422 would tend to load (i.e. damp) an amount of energy reaching the energy harvesting circuit 410.

The communications circuit 418 can be configured enter a standby state, disabled state, or turned off state to save power. The communications circuit 418 can also be configured to drain power from the energy storage device 406 only when in either of these states (i.e. the standby state, disabled state, or turned off state). The communications circuit 418 can be configured to generate the bypass switch control 424 signal when the communications circuit 418 is in either of these states so that the harvesting circuit 410 can harvest more energy, as discussed above.

Periodically, aperiodically, or randomly the communications circuit 418 can switch from such states to an active state that permits the communications circuit 418 to search for (e.g. poll for) any desired near field communication signals.

The signal processing circuit 422 in the communications circuit 418 is configured to translate the desired near-field communications signal into a baseband signal.

The near-field communications device 404 can be embedded in a wearable device, an earbud, a medical monitoring device, a smartwatch, a medical implant or a wide variety of other devices.

Figure 5A:
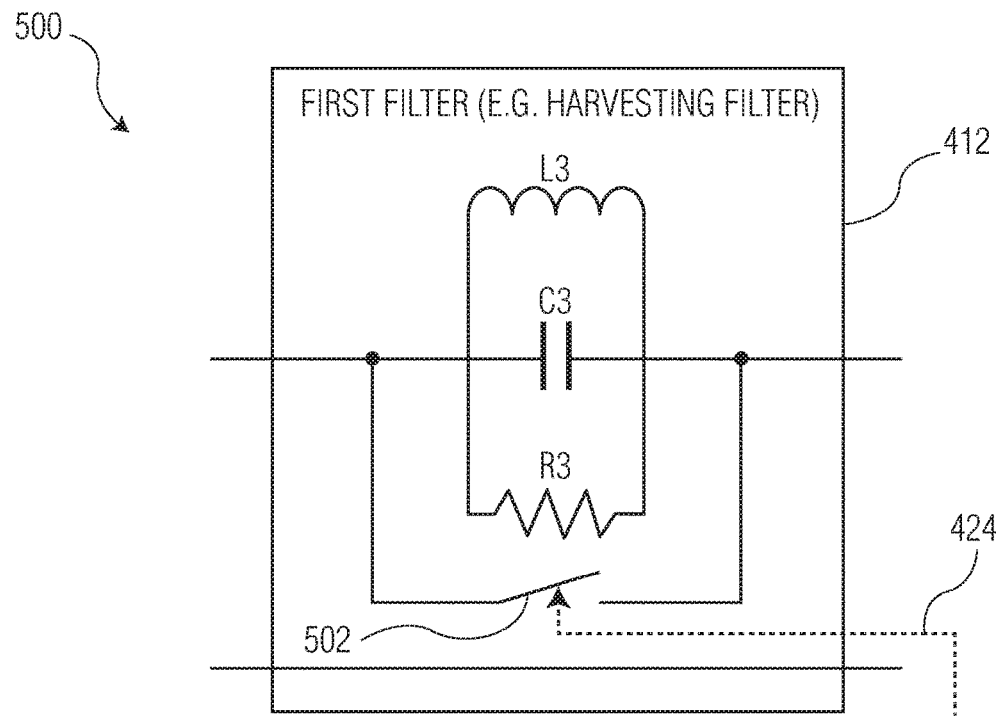
FIG. 5A is an example harvesting filter in the first near-field communications device.
Figure 5B:
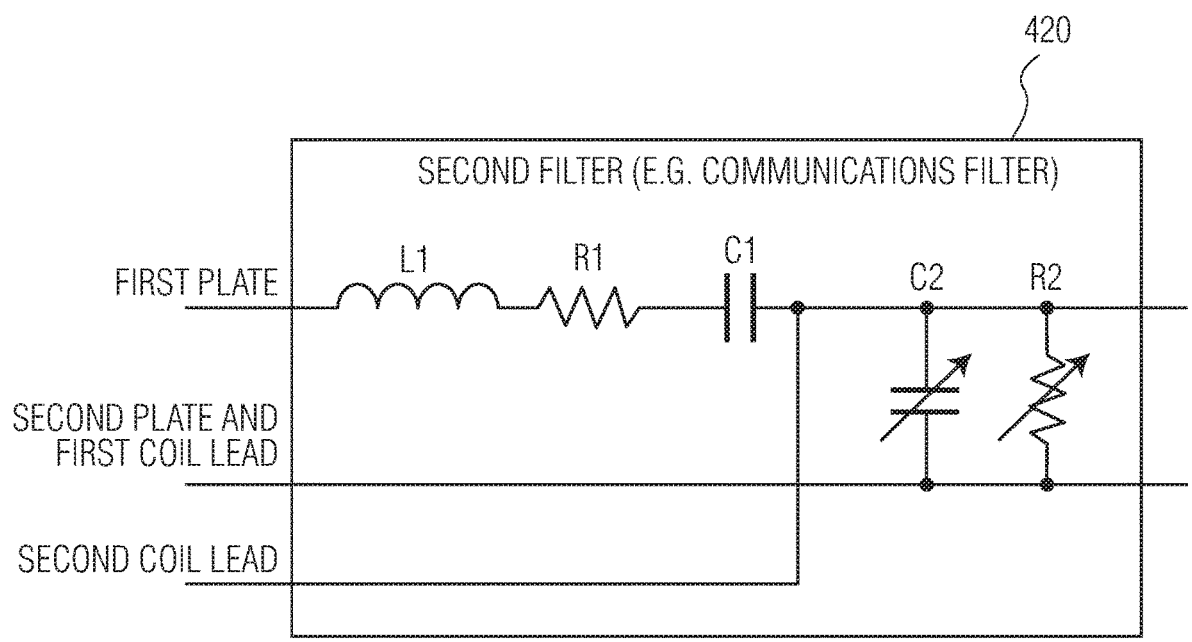
FIG. 5B is an example communications filter in the first near-field communications device.

FIGS. 5A and 5B show an example 500 harvesting filter 412 and communications filter 420 in the first near-field communications device 404. Discussed also with respect to FIG. 4, the harvesting filter 412 includes a bypass switch 502 that is responsive to a bypass switch control 424 signal from the communications circuit 418.

In the harvesting filter 412, L3 and C3 resonate at (i.e. blocks) the desired near-field communications frequency (e.g. centered about Fcom). R3 sets the bandwidth about Fcom that is blocked.

If the bypass switch control 424 signal is present, then the bypass switch 502 is closed and the first set of near-field energy (e.g. all of the near-field energy received by the near-field antenna 402) is passed to the rectifier 414 and power regulator 416.

If the bypass switch control 424 signal is absent, then the bypass switch 502 is open and only the second set of near-field energy (e.g. does not include the desired near field communication signals) is passed to the rectifier 414 and power regulator 416.

An example of the communications filter 420 is also shown with connections to the conductive plates 125, 130 (E-field) and to the coil 105 (H-field). L1 and C1 resonate at (i.e. passes) the desired near-field communications frequency (Fcom). R1 set a slightly higher bandwidth that has to be passed (for example 2 MHz) so as not to short low and high frequencies to ground. The coil 105 (H-field) and C2 are adaptively tuned to resonate at Fcom. R2 is adaptively tuned for a communication's signal bandwidth to be passed (e.g. 450 KHz).

Figure 6:
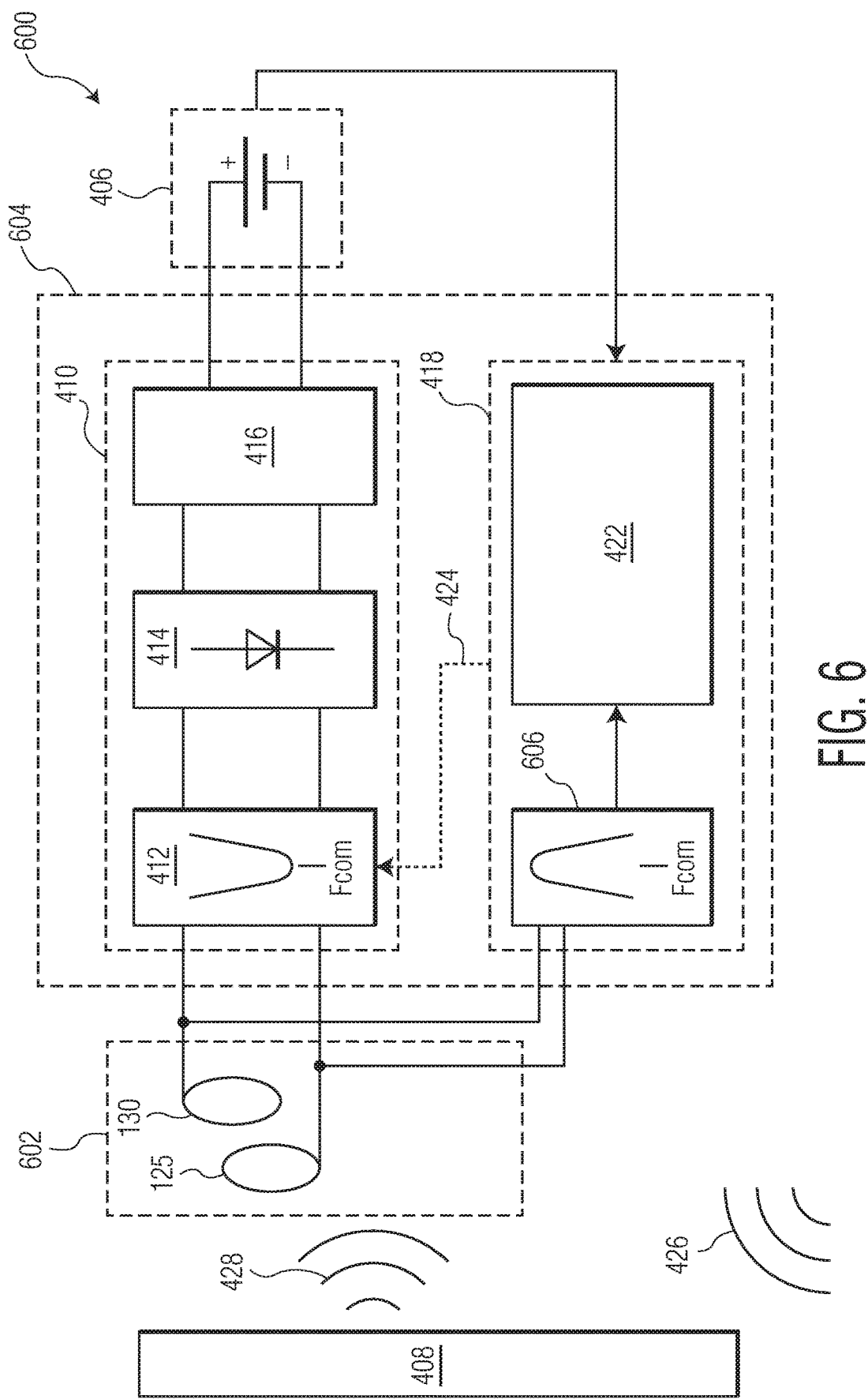
FIG. 6 is an example second near-field communications device.

FIG. 6 is an example 600 second near-field communications device 604. As compared to FIG. 4, example 600 includes a modified near-field antenna 602 that does not include a coil but is otherwise similar to near-field antenna 402. A second near-field communications device 604 is substantially similar to the first near-field communications device 404 except that a communications filter 606 is not connected to any coil. Example 600 thus shows an NFEI example embodiment, as compared to FIG. 4 which showed an NFEMI example embodiment.

Figure 7A:
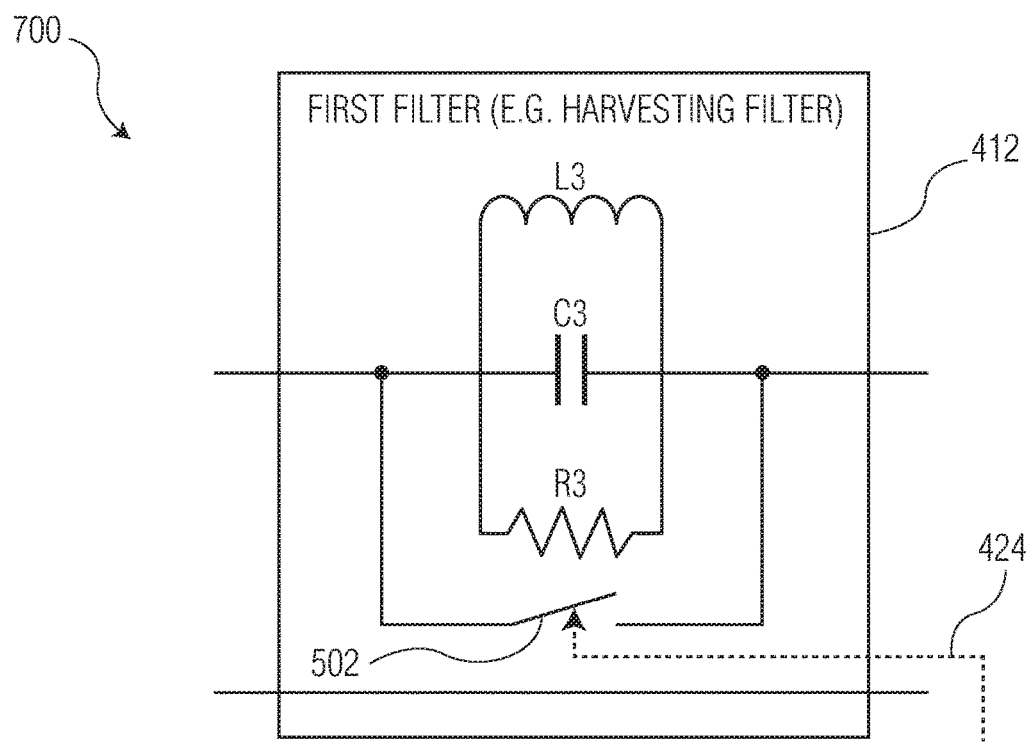
FIG. 7A is an example harvesting filter in the first near-field communications device.
Figure 7B:
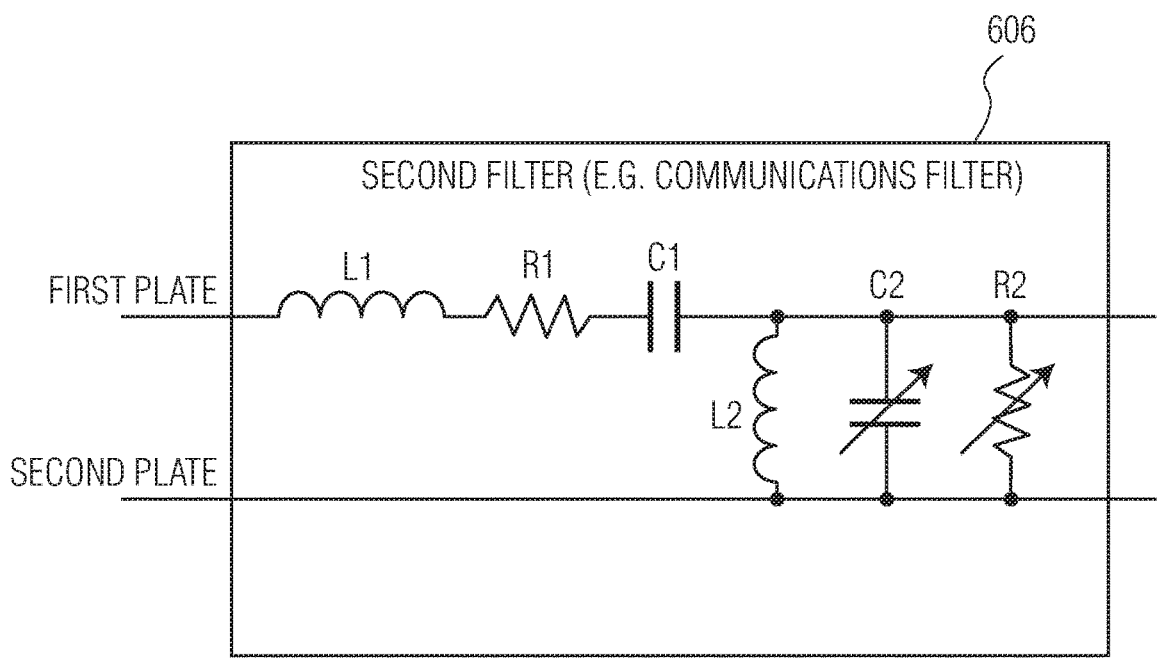
FIG. 7B is an example communications filter in the first near-field communications device.

FIGS. 7A and 7B show an example 700 harvesting filter 412 and communications filter 606 in the second near-field communications device 604.

Discussed also with respect to FIGS. 4 and 5A, the harvesting filter 412 includes a bypass switch 502 that is responsive to a bypass switch control 424 signal from the communications circuit 418.

In the harvesting filter 412, L3 and C3 resonate at (i.e. blocks) the desired near-field communications frequency (e.g. centered about Fcom). R3 sets the bandwidth about Fcom that is blocked.

If the bypass switch control 424 signal is present, then the bypass switch 502 is closed and the first set of near-field energy (e.g. all of the near-field energy received by the near-field antenna 402) is passed to the rectifier 414 and power regulator 416.

If the bypass switch control 424 signal is absent, then the bypass switch 502 is open and only the second set of near-field energy (e.g. does not include the desired near field communication signals) is passed to the rectifier 414 and power regulator 416.

An example of the communications filter 606 is also shown with connections to only the conductive plates 125, 130 (E-field). L1 and C1 resonate at (i.e. passes) Fcom. R1 sets a slightly higher bandwidth that has to be passed (for example 2 MHz) while not shorting low and high frequencies to ground. L2 replaces the coil 105 (H-field) from FIG. 5B. L2 and C2 are adaptively tuned to resonate at Fcom. R2 is adaptive tuned for the bandwidth that has to be passed (e.g. 450 KHz).

Figure 8:
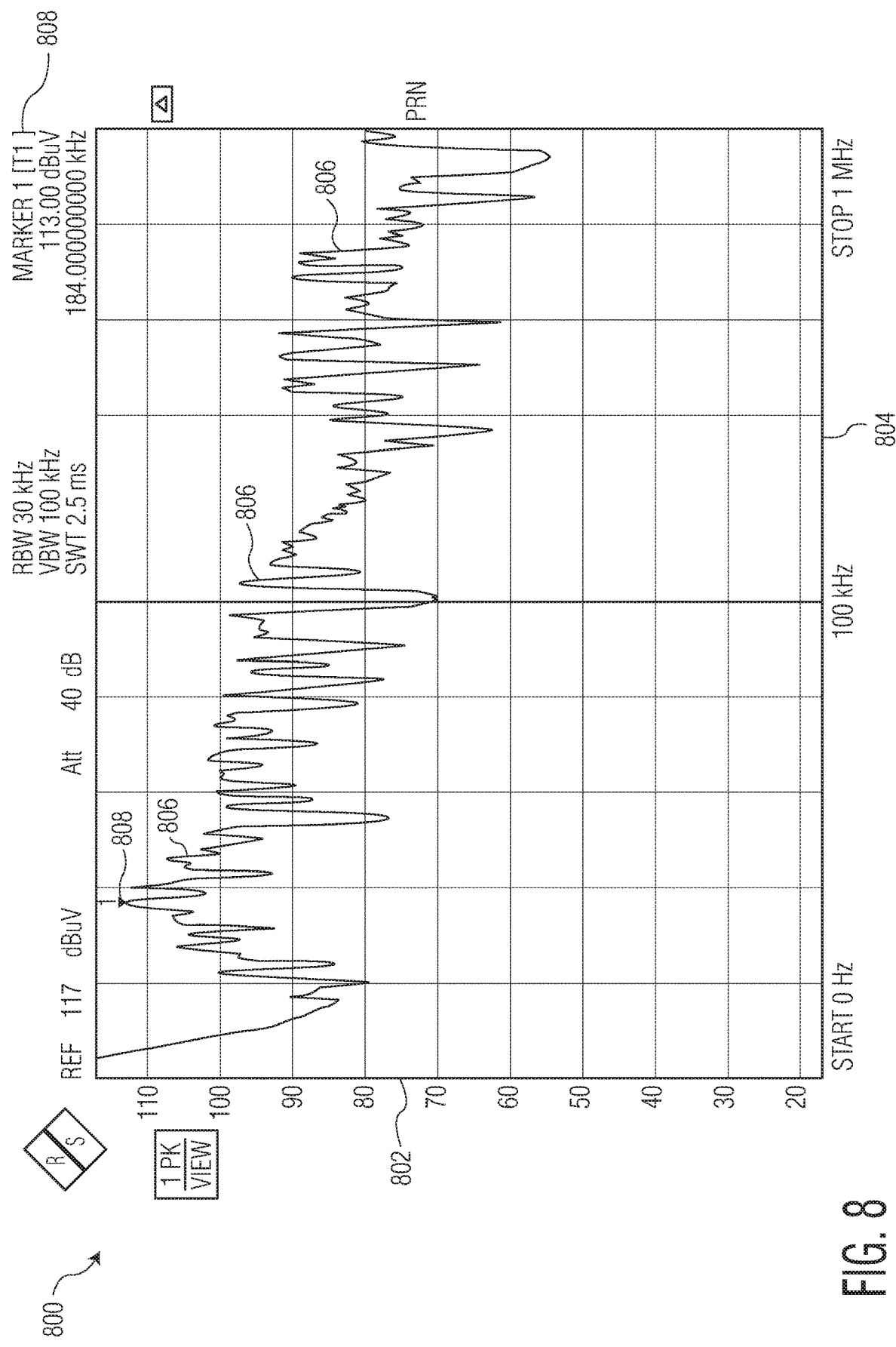
FIG. 8 is an example set of measured E-field generated voltages.

FIG. 8 is an example 800 set of measured E-field generated voltages 806. Example 800 show an x-axis as an RMS voltage 802 and a y-axis as frequency 804.

The measured E-field generated voltages 806 are received from the short loaded dipole (E-field) antenna 120 that has been positioned proximate to a human body. The horizontal axis 802 displays the frequency range where each division is 100 kHz (the 100 kHz at bottom is just a measurement device "labeling" of the "divisions" and scale shown on the screen and not the actual frequency).

The measured E-field generated voltages 806 from conductive plates 806 is sufficient for energy harvesting purposes. The measured voltages 806 in this example are highest in the 100 KHz range for electric devices. In case of nearby smart phones, Wi-Fi devices or Bluetooth devices also strong voltages are received at higher frequencies.

Marker 808 is positioned at a harmonic of a mains frequency from an external power grid and may include noise from motors and other systems either inside and/or outside of a home, office or industrial plant.

While some example embodiments the rectifier 414 may have an advertised 0.6 V diode drop, that's an RMS voltage. Peak (i.e. non-RMS) measured voltage from the conductive plates 125, 130 are much higher, (e.g. over 10 V sometimes)

and thus diodes in such an advertised rectifier 414 will be able to harvest the near-field energy.

Various instructions and/or operational steps discussed in the above Figures can be executed in any order, unless a specific order is explicitly stated. Also, those skilled in the art will recognize that while some example sets of instructions/steps have been discussed, the material in this specification can be combined in a variety of ways to yield other examples as well and are to be understood within a context provided by this detailed description.

In some example embodiments these instructions/steps are implemented as functional and software instructions. In other embodiments, the instructions can be implemented either using logic gates, application specific chips, firmware, as well as other hardware forms.

When the instructions are embodied as a set of executable instructions in a non-transient computer-readable or computer-usable media which are affected on a computer or machine programmed with and controlled by said executable instructions. Said instructions are loaded for execution on a processor (such as one or more CPUs). Said processor includes microprocessors, microcontrollers, processor modules or subsystems (including one or more microprocessors or microcontrollers), or other control or computing devices. A processor can refer to a single component or to plural components. Said computer-readable or computer-usable storage medium or media is (are) considered to be part of an article (or article of manufacture). An article or article of manufacture can refer to any manufactured single component or multiple components. The non-transient machine or computer-usable media or mediums as defined herein excludes signals, but such media or mediums may be capable of receiving and processing information from signals and/or other transient mediums.

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

What is claimed is:

1. A near-field communications device, comprising:
   an energy harvesting circuit configured to be coupled to a near-field antenna that is responsive to non-propagating quasi-static near-field energy;
   wherein the harvesting circuit is configured to harvest energy from the non-propagating quasi-static near-field energy; and
   wherein the harvesting circuit includes a harvesting filter configured to input a first set of near-field energy and output a second set of near-field energy;
   wherein the second set of near-field energy is a sub-set of the first set of near-field energy;
   wherein the near-field communications device is configured to receive a desired near-field communications signal from the first set of near-field energy; and
   wherein the desired near-field communications signal is substantially blocked by the harvesting filter.

2. The device of claim 1:
   wherein the near-field communications device is configured to receive near-field energy from the first set of near-field energy that does not include a desired near-field communications signal; and
   wherein the near-field energy that does not include the desired near-field communications signal is substantially passed by the harvesting filter.

3. The device of claim 1:
   wherein the harvesting filter includes a minima gain at a blocking frequency.

4. The device of claim 3:
   wherein the blocking frequency is substantially aligned with a center frequency of the desired near-field communications signal.

5. The device of claim 4:
   wherein the center frequency of approximately 10.6 MHz.

6. The device of claim 1:
   wherein the harvesting filter has minima gains at multiple blocking frequencies; and
   wherein each minima is substantially aligned with center frequencies of multiple desired near-field communications signals.

7. The device of claim 1:
   wherein the harvesting filter is a band-pass filter having a set of passed frequencies; and
   wherein the second set of near-field energy is only within the set of passed frequencies.

8. The device of claim 1:
   wherein the harvesting filter is either a high-pass filter or a low-pass filter having a respective set of either high-passed frequencies or low-passed frequencies; and
   wherein the second set of near-field energy is only within the set of passed frequencies.

9. The device of claim 1:
wherein the harvesting circuit further includes a bypass switch;
wherein the harvesting circuit is configured to harvest energy from the first set of near-field energy if the bypass switch control signal is present; and
wherein the harvesting circuit is configured to harvest energy from the second set of near-field energy if the bypass switch control signal is absent.

10. The device of claim 9:
further comprising a communications circuit;
wherein the communications circuit is configured to generate the bypass switch control signal when the communications circuit is either in a standby state, disabled state, or turned off state.

11. The device of claim 10:
wherein the communications circuit is configured to periodically, aperiodically, or randomly switch from either the standby state, disabled state, or turned off state to another state that permits the communications circuit to search or receive the desired near field communication signal.

12. The device of claim 10:
wherein the harvesting circuit is configured to harvest and store the near-field energy in an energy storage device; and
wherein the communications circuit is configured to drain power from the energy storage device only in either the standby state, disabled state, or turned off state.

13. The device of claim 1:
further comprising a communications circuit;
wherein the communications circuit includes a communications filter;
wherein the communications filter includes a maxima gain at a pass frequency; and
wherein the pass frequency is substantially aligned with a center frequency of the desired near-field communications signal.

14. The device of claim 1:
wherein the near-field antenna is responsive to non-propagating quasi-static near-field electric (E-field) energy; and
wherein the harvesting circuit is configured to harvest energy from the E-field energy.

15. The device of claim 13:
wherein the near-field antenna includes a set of conductive plates responsive to the E-field energy;
wherein the conductive plates are connectable to the harvesting filter; and
wherein the harvesting circuit is configured to harvest and store the E-field energy in an energy storage device.

16. The device of claim 1:
wherein the harvesting circuit includes a rectifier and a power regulator; and
wherein the rectifier and power regulator are configured to harvest and store the second set of near-field energy in an energy storage device.

17. The device of claim 1:
wherein the near-field communications device is configured to be located proximate to a conductive structure; and
wherein the near-field antenna receives the non-propagating quasi-static near-field energy from the conductive structure.

18. The device of claim 17:
wherein the conductive structure is at least one of: a human body, a vehicle, or a door security device.

19. The device of claim 1:
wherein the near-field communications device is embedded in at least one of: a wearable device, an earbud, a medical monitoring device, a smartwatch or an implant.

* * * * *